United States Patent
Tenny et al.

(10) Patent No.: US 10,492,114 B2
(45) Date of Patent: Nov. 26, 2019

(54) METHOD AND SYSTEM FOR MANAGING RADIO CONNECTIONS WITH A VIRTUAL ACCESS POINT

(71) Applicant: Futurewei Technologies, Inc., Plano, TX (US)

(72) Inventors: Nathan Edward Tenny, Poway, CA (US); Richard Stirling-Gallacher, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 332 days.

(21) Appl. No.: 15/077,456

(22) Filed: Mar. 22, 2016

(65) Prior Publication Data

US 2017/0280363 A1 Sep. 28, 2017

(51) Int. Cl.
*H04W 8/14* (2009.01)
*H04W 36/00* (2009.01)
(Continued)

(52) U.S. Cl.
CPC .......... *H04W 36/04* (2013.01); *H04W 8/14* (2013.01); *H04W 36/0011* (2013.01);
(Continued)

(58) Field of Classification Search
CPC ....... H04W 8/14; H04W 16/32; H04W 48/20; H04W 76/025; H04W 84/045;
(Continued)

(56) References Cited

U.S. PATENT DOCUMENTS 6,952,396 B1 * 10/2005 Cottreau ............. H04L 12/2852
370/222
8,254,333 B2 * 8/2012 Wu ....................... H04L 1/1874
370/331
(Continued)

FOREIGN PATENT DOCUMENTS

CN 104303485 A 1/2015
CN 104471972 A 3/2015
(Continued)

OTHER PUBLICATIONS

MiWeba, Millimetre-Wave Evolution for Backhaul and Access, EU Contract No. FP7-ICT-608637, D3.1 Separation of data and control plane, Nov. 2014, 34 pages.
(Continued)

*Primary Examiner* — Eric Nowlin
(74) *Attorney, Agent, or Firm* — Slater Matsil, LLP

(57) ABSTRACT

A stable virtual access point and a method for operating a stable virtual access point are disclosed. In embodiments a method for operating a logical endpoint of a stable virtual access point, wherein the logical endpoint includes an interface with a macro access point, wherein the stable virtual access point comprises a plurality of transmission points (TPs), and wherein the TPs provide a coordinated data transmission to a UE comprises storing, at the logical endpoint, a connection status of the UE, receiving, at the logical endpoint, information regarding the connection status of the UE from the macro access point, determining, at the logical endpoint, a change in the connection status of the UE and updating, at the logical endpoint, the connection status of the UE with respect to the change.

10 Claims, 9 Drawing Sheets

(51) Int. Cl.
*H04W 36/04* (2009.01)
*H04W 84/04* (2009.01)
*H04W 88/08* (2009.01)
*H04W 92/20* (2009.01)

(52) U.S. Cl.
CPC ...... *H04W 36/0055* (2013.01); *H04W 84/045* (2013.01); *H04W 88/085* (2013.01); *H04W 92/20* (2013.01)

(58) Field of Classification Search
CPC ............ H04W 92/20; H04W 36/0011; H04W 36/0072; H04W 36/04; H04W 36/08
See application file for complete search history.

(56) References Cited

U.S. PATENT DOCUMENTS

| | | | | |
|---|---|---|---|---|
| 8,745,007 | B2* | 6/2014 | Zhang | G01R 19/2513 707/661 |
| 9,143,991 | B2 | 9/2015 | Chen et al. | |
| 9,197,683 | B2* | 11/2015 | Fwu | H04W 72/0493 |
| 9,565,605 | B1* | 2/2017 | Yang | H04W 76/18 |
| 9,730,229 | B2* | 8/2017 | Lee | H04W 72/048 |
| 9,763,151 | B2* | 9/2017 | Kim | H04L 5/00 |
| 9,813,970 | B2* | 11/2017 | Madan | H04W 36/32 |
| 9,820,312 | B2* | 11/2017 | Wu | H04W 76/18 |
| 9,894,584 | B2* | 2/2018 | Moon | H04W 24/10 |
| 9,930,581 | B2* | 3/2018 | Bai | H04W 36/0055 |
| 10,009,952 | B2* | 6/2018 | Kim | H04L 5/00 |
| 10,045,266 | B2* | 8/2018 | Kang | H04W 36/04 |
| 10,091,759 | B2* | 10/2018 | Lin | H04W 64/006 |
| 10,159,072 | B2* | 12/2018 | Chang | H04W 72/0426 |
| 10,182,393 | B2* | 1/2019 | Agyapong | H04W 16/32 |
| 2002/0104067 | A1* | 8/2002 | Green | G06F 8/24 717/101 |
| 2009/0310559 | A1* | 12/2009 | Chen | H04W 36/0055 370/331 |
| 2010/0074222 | A1* | 3/2010 | Wu | H04L 1/1874 370/331 |
| 2011/0039520 | A1 | 2/2011 | Maida et al. | |
| 2011/0249651 | A1* | 10/2011 | Kang | H04W 36/0033 370/331 |
| 2013/0003648 | A1* | 1/2013 | Hahn | H04W 36/0005 370/315 |
| 2013/0086665 | A1* | 4/2013 | Filippi | H04L 63/0272 726/7 |
| 2013/0109396 | A1* | 5/2013 | Drazynski | H04W 36/0033 455/444 |
| 2013/0115955 | A1* | 5/2013 | Deng | H04W 48/16 455/437 |
| 2013/0150039 | A1* | 6/2013 | Ramle | H04W 36/0061 455/436 |
| 2013/0322375 | A1* | 12/2013 | Chang | H04W 72/0426 370/329 |
| 2014/0248882 | A1* | 9/2014 | Wang | H04W 24/04 455/436 |
| 2014/0317314 | A1 | 10/2014 | Nigam et al. | |
| 2014/0321282 | A1 | 10/2014 | Pragada et al. | |
| 2014/0335882 | A1* | 11/2014 | Lee | H04W 76/025 455/452.2 |
| 2014/0376515 | A1 | 12/2014 | Lei et al. | |
| 2015/0063295 | A1* | 3/2015 | Himayat | H04W 36/0022 370/331 |
| 2015/0071248 | A1* | 3/2015 | Faerber | H04W 36/0055 370/331 |
| 2015/0163687 | A1* | 6/2015 | Lee | H04W 24/10 370/252 |
| 2015/0365854 | A1* | 12/2015 | Bai | H04W 36/0055 370/217 |
| 2015/0373602 | A1* | 12/2015 | Hampel | H04W 36/08 455/437 |
| 2015/0373754 | A1* | 12/2015 | Wu | H04W 76/18 370/329 |
| 2016/0183135 | A1* | 6/2016 | Kang | H04W 76/15 455/444 |
| 2016/0192433 | A1* | 6/2016 | Deenoo | H04W 72/046 370/329 |
| 2016/0198481 | A1* | 7/2016 | Kikuchi | H04W 16/06 455/452.2 |
| 2016/0219475 | A1* | 7/2016 | Kim | H04L 5/00 |
| 2016/0227454 | A1* | 8/2016 | Toskala | H04W 36/0033 |
| 2016/0278032 | A1* | 9/2016 | Yi | H04W 16/32 |
| 2016/0302127 | A1* | 10/2016 | Moon | H04W 24/10 |
| 2016/0345231 | A1* | 11/2016 | Moon | H04W 36/0055 |
| 2017/0048918 | A1* | 2/2017 | Iwamura | H04W 52/0206 |
| 2017/0078244 | A1* | 3/2017 | Zhang | H04W 4/029 |
| 2017/0099611 | A1* | 4/2017 | Henttonen | H04W 8/00 |
| 2017/0164348 | A1* | 6/2017 | Agiwal | H04W 72/0406 |
| 2017/0164419 | A1* | 6/2017 | Kim | H04L 5/00 |
| 2017/0188285 | A1* | 6/2017 | Moon | H04W 36/0055 |
| 2017/0208526 | A1* | 7/2017 | Madan | H04W 36/32 |
| 2017/0215184 | A1* | 7/2017 | Chang | H04W 72/0426 |
| 2017/0280363 | A1* | 9/2017 | Tenny | H04W 36/04 |
| 2018/0041937 | A1* | 2/2018 | Madan | H04W 36/32 |
| 2018/0160357 | A1* | 6/2018 | Moon | H04W 24/10 |
| 2018/0176977 | A1* | 6/2018 | Liu | H04W 24/04 |
| 2018/0279403 | A1* | 9/2018 | Kim | H04L 5/00 |

FOREIGN PATENT DOCUMENTS

| | | | |
|---|---|---|---|
| JP | 2015500605 A | 1/2015 | |
| RU | 2531582 C2 | 10/2014 | |
| WO | 2013120274 A1 | 8/2013 | |
| WO | 2015069026 A1 | 5/2015 | |
| WO | WO-2015143914 A1 * | 10/2015 | |
| WO | 2016020146 A1 | 2/2016 | |
| WO | WO-2016053426 A1 * | 4/2016 | |
| WO | WO 2016165127 A1 * | 10/2016 | ............ H04W 16/32 |

OTHER PUBLICATIONS

3GPP TS 25.467; 3rd Generation Partnership Project; Technical Specification Group Radio Access Network; UTRAN architecture for 3G Home Node B (HNB); Stage 2, (Release 13), V13.0.0, Dec. 2015, 91 pages.

3GPP TS 36.331, 3rd Generation Partnership Project; Technical Specification Group Radio Access Network; Evolved Universal Terrestrial Radio Access (E-UTRA); Radio Resource Control (RRC); Protocol specification (Release 13), V13.0.0, Dec. 2015, 507 pages.

3GPP TS 36.300, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; State 2 (Release 13), V13.2.0, Dec. 2015, 290 pages.

* cited by examiner

METHOD AND SYSTEM FOR MANAGING RADIO CONNECTIONS WITH A VIRTUAL ACCESS POINT

TECHNICAL FIELD

The present invention relates to dual connectivity with a virtual access point comprising a plurality of transmission points, and in particular, to dual connectivity with a mmW virtual access point comprising a plurality of coordinated transmission points.

BACKGROUND

In LTE dual connectivity, the UE can receive or transmit data from or to multiple evolved NodeB (eNBs). There is a Master eNB (MeNB) and one or more Secondary eNBs (SeNB). In LTE release 12 specifications, only the case of one MeNB and one SeNB is considered.

Dual Connectivity in a LTE network can significantly improve per-user throughput and mobility robustness by allowing UEs to be connected simultaneously to a master cell group (MCG) and a secondary cell group (SCG) via a MeNB and a SeNB, respectively. The increase in per-user throughput is achieved by aggregating radio resources from at least two eNBs. The dual connectivity helps also in load balancing between MCG and SCG.

SUMMARY

An embodiment of the invention provides a method for operating a logical endpoint of a stable virtual access point, wherein the logical endpoint comprises an interface with a macro access point, wherein an user equipment (UE) is in communication to the macro access point and the stable virtual access point, wherein the stable virtual access point comprises a plurality of transmission points (TPs), wherein the TPs provide a coordinated data transmission to the UE, and wherein the method comprises storing, at the logical endpoint, a connection status of the UE, receiving, at the logical endpoint, information regarding the connection status of the UE from the macro access point, determining, at the logical endpoint, a change in the connection status of the UE, and updating, at the logical endpoint, the connection status of the UE with respect to the change.

Another embodiment of the invention provides a method for operating a stable virtual access point, wherein the stable virtual access point includes a logical endpoint and a plurality of transmission points (TPs), wherein the stable virtual access point has an interface with a macro access point through the logical endpoint, wherein the TPs provide a coordinated data transmission to an user equipment (UE), and wherein the method comprises deciding, by the stable virtual access point, to change a master transmission point (MTP) from a first TP to a second TP, changing, by the stable virtual access point, the MTP from the first TP to the second TP and notifying the UE.

Yet another embodiment of the invention provides a method for handing a user equipment (UE) over on a virtual access point layer, the method includes receiving, at a first logical endpoint, a handover request from a target macro access point and performing, at the first logical endpoint, a handover of the UE on the virtual access point layer from a source macro access point to the target macro access point.

A further embodiment of the invention provides a stable virtual access point including a plurality of transmission points (TPs), wherein a TP of the TPs is a master transmission point (MTP) and a logical endpoint, wherein the stable virtual access point provides via the TPs a connection to a user equipment (UE), wherein the TPs are configured to provide a coordinated data transmission to the UE, wherein the stable virtual access point has a defined interface via the logical endpoint to a macro access point, and wherein the UE is also connected to the macro access point.

A yet further embodiment of the invention provides a stable virtual access point comprising a logical endpoint comprising an interface with a macro access point and a plurality of transmission points (TPs) including a master transmission point (MTP), wherein the TPs provide a coordinated data transmission to an user equipment (UE), wherein the UE is in communication with the macro access point and the TPs, and wherein the logical endpoint is configured to receive information regarding a connection status of the UE from the macro access point, to determine a change in the connection status of the UE and to update at the logical endpoint the connection status of the UE with respect to the change.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
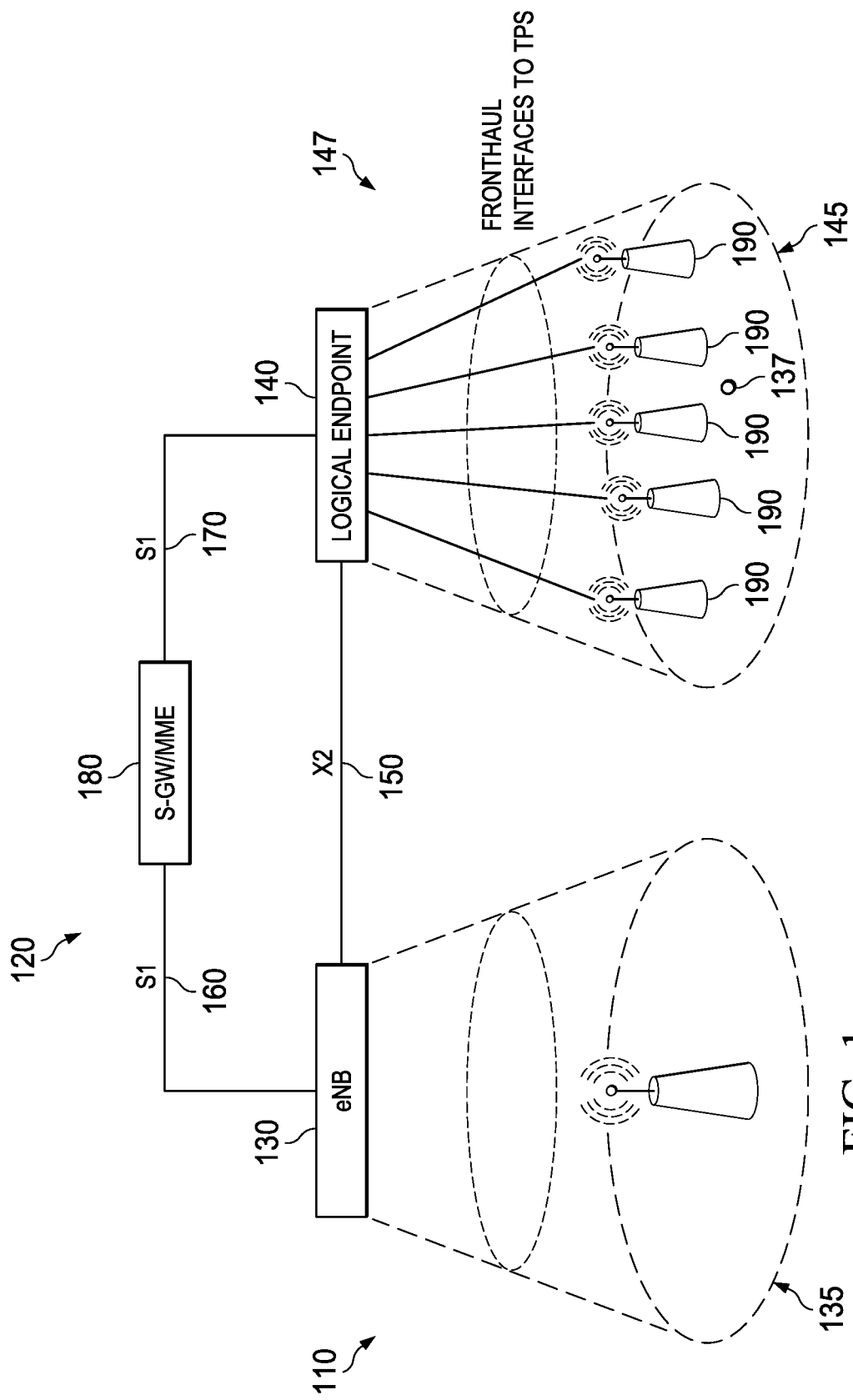
FIG. 1 illustrates a system of a macro access point and a stable virtual access point according to an embodiment.

Millimeter wave (mmW) radio communication is well known to offer a mix of benefits and difficulties. The leading difficulties come from requirement such as beam forming in the mmW frequency range, beam tracking, resource allocation, interference coordination, and mobility between transmission points (TPs).

To simplify some of these problems a "virtual cell" or a "cloud cell" has been proposed in which multiple (or a group of) transmission points (TPs) are coordinated so as to present to the user the illusion of a single cloud cell whose footprint follows the user.

A master TP (MTP), functioning as a single control point at one of the TPs, is configured to coordinate radio resource usage across the virtual access point (e.g., cloud cell), and configured to control interactions over an interface (such as X2 and S1 interfaces in LTE) to the network is proposed. However, since the MTP's role is potentially different for cloud cells that serve different UEs, and since the cloud cell changes dynamically as it reconfigures itself, coordinating the communication between the cloud cell and the network is challenging.

Accordingly, there is a need to manage the interfaces between a cloud cell and the radio gateway node (e.g., eNB), the Mobility Management Entity (MME) and the user equipment (UE) gateway node so that they can communicate with the cloud cell as a unit, rather than constantly maintaining many connections to different TPs whose roles are constantly changing.

Embodiments of the invention provide a network interface approach that defines a virtual access point (e.g., cloud cell) with a consistent and stable logical endpoint. The logical endpoint has a defined and consistent interface or interfaces with the other network nodes. Such a logical endpoint can be integrated into a cellular network thereby insulating the existing network from many of the complexities that are specific to the network-cloud cell relationship. In the description LTE terminology may be used, however, the design should be seen in a 5G context as well.

In some embodiments a virtual access point with the logical endpoint presents itself to the network as a secondary access point (e.g., secondary eNB) for most purposes. The virtual access point with a logical endpoint (or described herein as stable virtual access point or a virtual access point unit) comprises a logical endpoint (or logical endpoint function) defining the network interfaces with the other network nodes and a virtual access point. The virtual access point and the logical endpoint may have an adaption layer or an interface over which they communicate. The logical endpoint function may be physically embodied in a network node or network element such as a macro access point (e.g., eNB). Detailed embodiments of the invention are described further below.

Connection control activities such as mobility require substantial interactions between the macro access point (e.g., eNB) and the stable virtual access point (e.g., cloud cell on the mmW layer with a logical endpoint) beyond what is already provided by the dual-connectivity framework. As one example, the LTE measurement system for radio resource management (RRM) assumes that the serving eNB can always interpret measurement results sent from the UE. However, when the measurement object is a mmW frequency, the serving eNB is unlikely to have the insight into the dynamic radio conditions (e.g., beamforming tracking) that would allow it to take reasonable decisions based on the measurement results. Accordingly, embodiments of the invention describe procedures for these interactions to take place through the logical endpoint.

Mobility, in both the mmW and macro layers, poses coordination challenges that vary with the deployment. Embodiments provide a flexible architecture that can be adapted to various deployment choices. In addition, embodiments provide the logical endpoint for simple and complex deployments enabling mobility with minimal impact to the macro layer.

Finally, embodiments provide radio link recovery after a failure on the coordinated virtual access point (mmW layer) where radio links may be fragile, meaning that failure is likely to be a common occurrence that should be handled seamlessly.

FIG. 1 shows a stable virtual access point 147 in a radio access network (RAN) 110 and a core 120 environment. The RAN 110 comprises a macro access point 130 and the stable virtual access point 147. The macro access point 130 may be a base station, for example, an evolved Node B (eNB). The base station 130 serves as an access point for the UEs. The UEs may be cellular telephones, smartphones, computer tablets, computer laptops or desktops, or other personal devices capable of establishing wireless communications.

The stable virtual access point 147 comprises the logical endpoint 140 and the virtual access point 145. The transmission points (TPs) 190 are secondary access points. Each of the secondary access points 190 may comprise a physical footprint that is smaller or much smaller than the physical footprint of the macro access point 130. The combined physical footprints of the secondary access points 190 may be of any size compared to the physical footprint of the macro access point 130.

Each TP 190 may be a lower power eNB. The TPs 190 may operate in a different frequency than the macro access point 130. For example, each TP 190 may be an mmW TP that is configured to emit and receive signals in the mmW spectrum. The TPs 190 may be femto cells, e.g., home eNBs (HeNBs), pico cells, micro cells, remote radio heads (RRH), access points or combinations thereof. The TPs 190 may form cellular regions that overlap with one or more of the other TPs 190 (overlapping footprints).

The TPs 190 may form the virtual access point 145 (an mmW coordinated virtual access point) with a master transmission point (MTP) at one of the TPs 190. The stable virtual access point 147 includes the virtual access point 145 and the logical endpoint 140. The logical endpoint 140 is a defined interface whose connectivity to the cellular network does not change with respect to cellular network nodes or network elements (e.g., macro eNBs, core network elements) over a substantial period of time (stable logical endpoint). This stable connectivity is provided towards the cellular network even though the composition of the virtual access point may change frequently. The composition of the (stable) virtual access point 145, 147 may change constantly on the mmW layer but the logical endpoint 140 remains a fixed "anchor" point of connectivity from the viewpoint of the cellular network (macro layer and core network). In some embodiments, the logical endpoint may change infrequently (less frequent) when compared to a macro layer handover. In some embodiment, the logical endpoint 140 through which a UE 137 does not change even if the UE moves from a first macro access point to a second macro access point (or to a plurality of macro access points). The virtual access point 145 (without the logical endpoint 140) may also change by adding and dropping TPs or by moving the MTP from one of the TPs to other TPs.

The routing address of the logical endpoint 140 may be different than the routing addresses of the TPs 190 (including MTP). This is true even though the logical endpoint 140 may be physically located at the MTP as shown in FIG. 9B. In this scenario, the logical endpoint 140 and the MTP are separately addressable. From a network view, the logical endpoint 140 allows the macro access point 130 to address the virtual access point as if it were a secondary access point (e.g., SeNB).

From an access point view, the logical endpoint 140 and the MTP 190 may be two different functions that communicate via an adaption layer or an interface. The virtual access point may comprise a MTP that may take over substantial functions in operating the coordinated virtual network of TPs 190 (virtual access point) and managing the TPs 190. The MTP may change from time to time, however, the logical endpoint 140 does not necessarily change. In various embodiments the change of logical endpoint 140 should be separated in time from a change of the MTP and handled as different, independent procedures. The MTP may be dynamically selected. For example, the MTP layer may be dynamically selected as a function of resource management for the mmW layer. In some embodiments the virtual access point operates on a separate inter-frequency layer (e.g., mmW layer) than the macro access points.

In some embodiments, the stable virtual access point 147 or the virtual access point 145 (in particular the TPs 190 coordinated by the MTP) is configured to transmit, send or receive a common data stream to or from the UE. The virtual access point 147/145 may handle the control signals with limited involvement of the macro access point 130. For example, the virtual access point 147/145 may store and maintain the connection status for its UEs and does not operate just as a router. The connection status is the status of the UE's connection. The UE's connection status may be the UE's association with a particular TP (or TPs), macro access point (e.g., eNB) and logical endpoint. The connection status may be stored in the logical endpoint 140 or in the MTP. In various embodiments, the TPs 190 or all TPs 190 of the virtual access point 147/145 may transmit or receive data in the same frequency or frequency range. In other words the TPs 190 may not transmit or receive data in frequencies or frequency ranges different from each other. The virtual access point 147/145 (e.g., cloud cell) may add or drop (delete) TP(s) 190 to or from the virtual access point 147/145. This may be handled by the MTP without involvement of the macro access point.

The macro access point 130 and the stable virtual access point 147 (through the logical endpoint 140) may be communicatively connected via the access point/access point interface 150 (e.g., X2 interface) and the stable virtual access point 147 (through logical endpoint 140) may be connected to the core 120 via the access point/core interface 170 (e.g., S1 interface). The logical endpoint 140 may provide a standard termination for the access point/access point interface (e.g., X2 interface) 150 or the access point/ core interface (e.g., S1 interface) 170. The macro access point 130 and the core 120 may be connected via a macro access point/core interface 160 (e.g., S1 interface). The core 120 may be an evolved packet core (EPC). The core may include a mobility control node (e.g., Mobility Management Entity (MME)), other MMEs, and a UE gateway (such as a serving gateway) 180. The MME is the control node that processes the signaling between the UE and the core 120 and the gateway handles and transfers all the other data (e.g., IP) packets. Generally, the MME provides aspects of bearer and connection management (e.g., bearer transport and connection mobility between different access points).

The macro access point 130 and the stable virtual access point 147 are each assigned to respective coverage areas (e.g., cell 135 and cloud cell 145) and are configured to provide access to the core 120 for one or more UEs 137 in the coverage area 135 and 145. Each UE 137 in the coverage area of cell 135 may be associated with its own virtual access point 145, corresponding to communication through the logical endpoint 140 and the stable virtual access point 147. The coverage area of the macro access point 130 may be larger than the coverage area of the logical endpoint 140. The coverage areas may overlap or partially overlap. In some embodiments the coverage area 145 of the logical endpoint 140 may be within the coverage area 135 of the macro access point 130. In other embodiments a portion of the coverage area 145 of the logical endpoint 140 may be arranged outside of the coverage area 135 of the macro access point 130. The macro access point 130 and the MTP are responsible for radio related functions including radio bearer control, admission control, mobility control, scheduling, security and connectivity to the serving gateway 180. The logical endpoint 140 provides a unified communication support for all these functions. However, the entity that performs these functions in the stable virtual access point is actually the MTP and not the logical endpoint 140 (even though the circuitry of logical endpoint 140 may be physically located near the logic of the MTP on the MTP). Communications of the stable virtual access point 147 with other nodes (e.g., macro access point 130) in support of these radio related functions take place via the logical endpoint 140.

Figure 2:
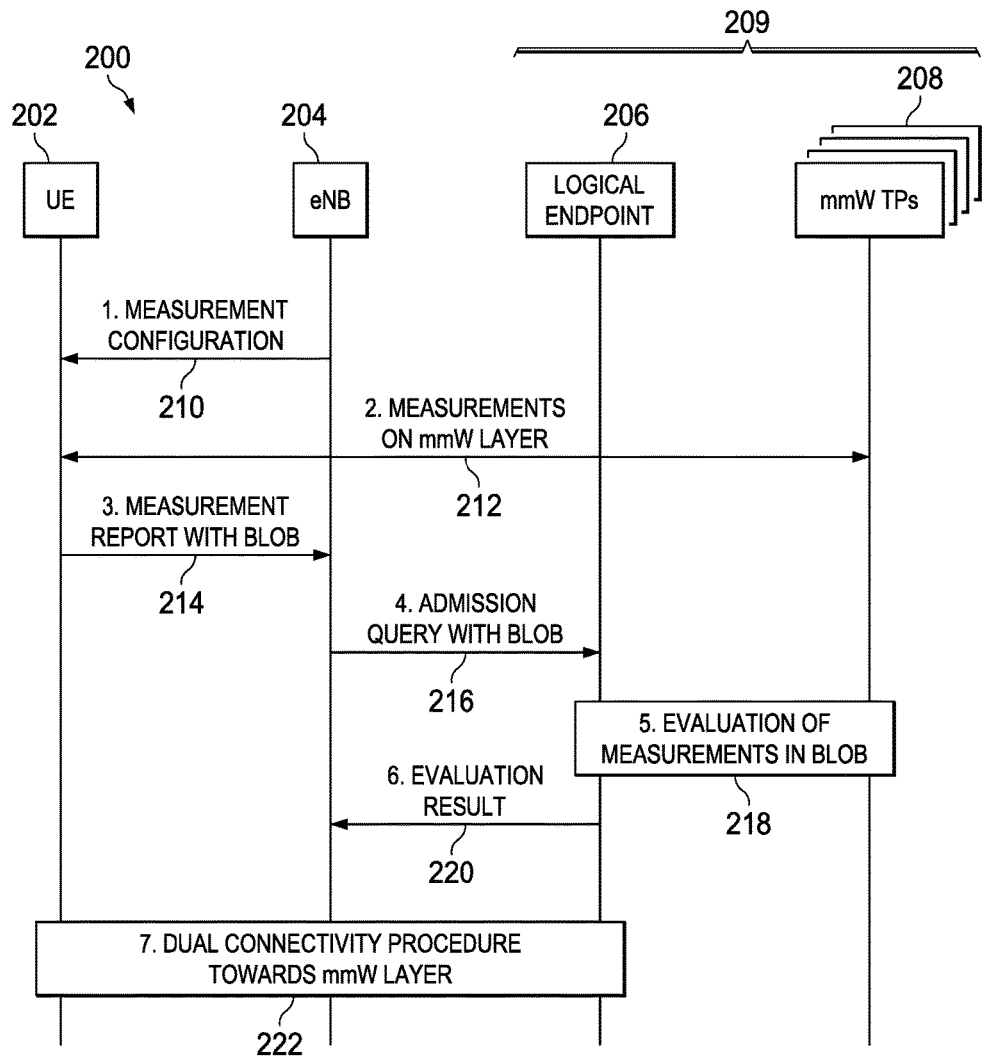
FIG. 2 illustrates a diagram of a measurement procedure on the stable virtual access point according to an embodiment.

FIG. 2 is a diagram 200 illustrating an example of a measurement procedure on the stable virtual access point 209 (e.g., a frequency layer that is different than the macro frequency layer such as an mmW layer). The UE 202 measures and reports the signals of one or more TPs within the frequency layer and reports the measurement results to the macro access point 204. However, because the macro access point 204 may not be suited for evaluating the measurement results, the measurement results may be evaluated by the virtual access points 208 (e.g., mmW TPs) and communicated via the logical endpoint 206 to the macro access point 204 (e.g., X2 interface). The location of the evaluation function may be opaque to the macro access point (e.g., eNB). The evaluation function may be hosted in any of a variety of network nodes, e.g., one or more of the mmW TPs, a separate node implementing the logical endpoint functionality, or a logically separate domain within the hardware of the macro access point itself.

The macro access point 204 (e.g., eNB) requests measurement by sending an RRC message to the UE 202 providing a measurement configuration and the UE 202 reports the measurements by measuring the signals, steps 210 and 214. The measurement configuration comprises a frequency measurement object for frequencies of the virtual access point 209, and these frequencies may not be used in the macro access point 204. For example, the frequency measurement object may be an mmW frequency measurement object. However, measuring this frequency (e.g., mmW frequency) is very different from measuring the macro access point frequencies, because the signals to be measured have characteristics specific to the virtual access point frequency, such as beamforming and time-multiplexed beam pattern. Accordingly, the macro access point 204 may not be a good evaluator of these results. The method 200 may provide a transparent tunneling of mmW measurement data through the macro access point 204 to an evaluation function of the virtual access point (TPs 208 with support of the logical endpoint 206).

The UE 202 performs measurements on the frequency layer (e.g., mmW layer, other layer than the macro layer) in step 212 (e.g., the network passively broadcasts signals with known characteristics, such as downlink reference signals, and the UE silently measures them). As described above, the UE 202 reports these measurement results to the macro access point 204 in step 214. The UE 202 may report the results in a binary large object (blob), whose content may not be intelligible to the macro access point 204. After reporting the measurement results to the macro access point 204, the macro access point 204 may send an admission query (e.g., with the blob) to the logical endpoint 206 at step 216. The stable virtual access point 209 (logical endpoint 206 and the TP(s) 208) evaluates the measurement results (e.g., in the blob) in step 218. The logical endpoint 206 then sends back the evaluation of the measurement results to the macro access point 204 in step 220. Finally, in step 222, a dual connectivity procedure towards the macro access point frequency layer and the frequency layer of the virtual access point (e.g., mmW layer) is performed between the UE 202 and the logical endpoint 206.

Figure 3:
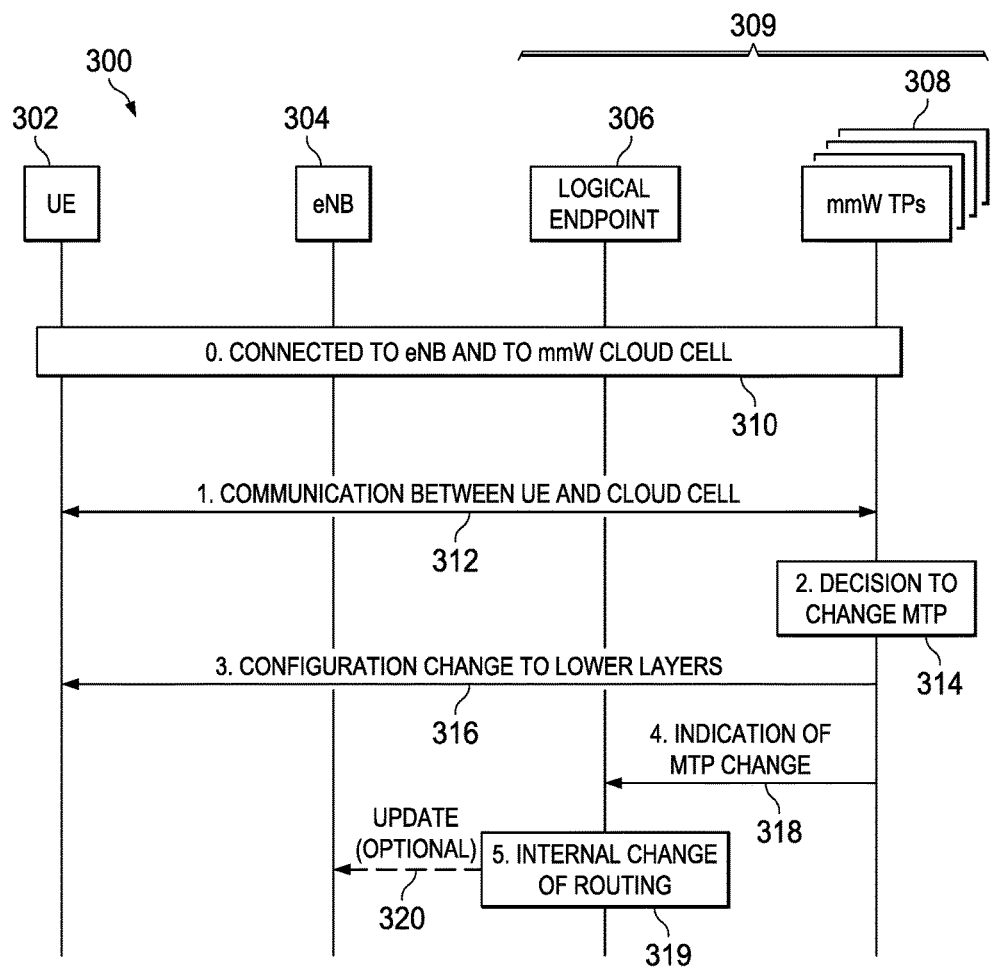
FIG. 3 illustrates a diagram of mobility control in a stable virtual access point according to an embodiment.

FIG. 3 shows a diagram 300 illustrating an example for controlling mobility in the virtual access point (frequency layer such as the mmW layer). For example, mobility control on the mmW layer may include changing the master transmission point (MTP). Changing the MTP may be invisible to the macro access point 304 (e.g., eNB). The logical endpoint 306 may store or maintain the virtual access point 308 (e.g., cloud cell) configuration. A decision to change the MTP may be originated in the virtual access point 308 (the TPs) but maintained and stored in the logical endpoint 306. The access point/access point interface (e.g., X2 interface) may be the same even though the MTP has changed since the virtual access point 308 is the same (e.g., comprises the same TPs but with a different configuration). The signal flow for changing the MTP in the stable virtual access point 309 may be as follows: in step 310, the UE 302 is connected to the macro access point 304 and the stable virtual access point 309. Typically, the UE 302 and the stable virtual access point 309 communicate over the air with each other as shown in step 312. In step 314, the stable virtual access point 309 (in particular the virtual access point, TPs 308) decides to change the MTP. The decision to change the MTP may be made by a subset of the TPs 308, e.g., by the current MTP. The virtual access point 308 notifies the UE 302 about the change in MTP in step 316 and the TPs 308 notify the logical endpoint 306 of the change in the MTP. The logical endpoint 306 may store these data in a register or table by modifying the stored data for the old MTP (a first TP, identified in the stored data as the MTP prior to the change procedure) and the new MTP (a second TP, identified in the stored data as the MTP subsequent to the change procedure). The logical endpoint 306 stores the new MTP in order to change routing pattern accordingly so that the new MTP can fulfill its function. The logical endpoint 306 may notify the macro access point 304 about the change in the MTP in some embodiments at step 320. In other embodiments, the logical endpoint 306 may not notify the macro access point 304 about the change in the MTP.

In various embodiments, the signal flow for other stable virtual access point configurations and compositions may be substantially the same as the signal flow for changing the MTP.

In various embodiments, steps 310-314 may be purely lower layer (frequency or mmW) measurement or reconfiguration procedures. For example, these procedures may be MAC signaling and not RRC signaling.

Figure 4:
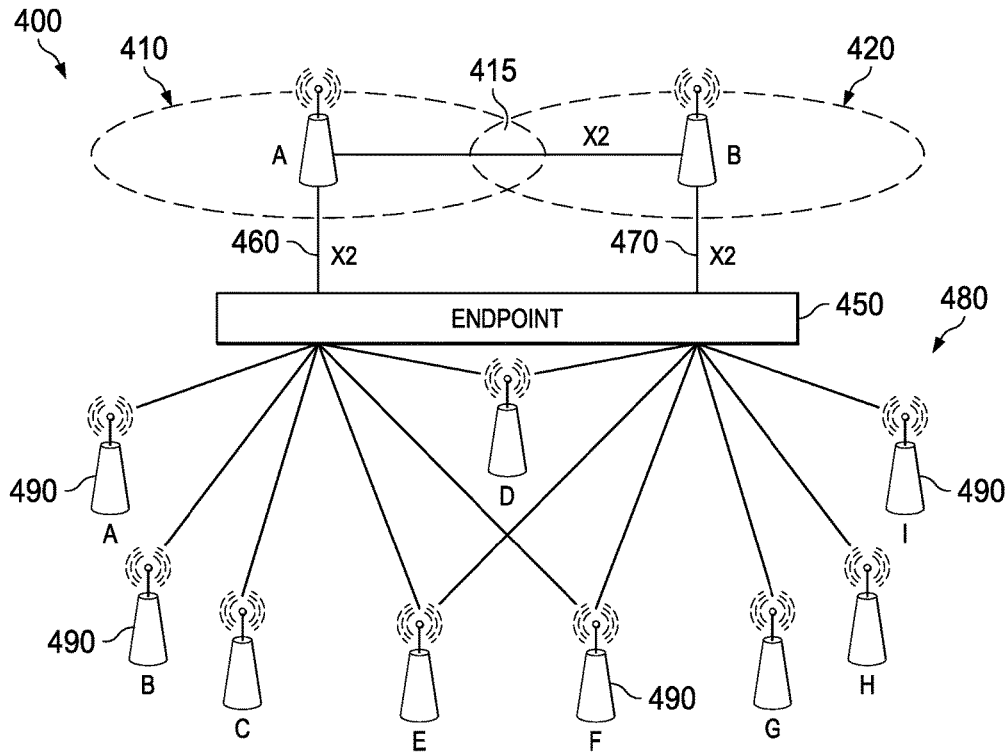
FIG. 4 illustrates a topology of two macro access points and a stable virtual access point according to an embodiment.

FIG. 4 shows a system 400 illustrating an example of a topology of a stable virtual access point (e.g., stable cloud cell). The system 400 comprises a first macro access point 410 (e.g., eNB), a second macro access point 420 (e.g., eNB), and a stable virtual access point 480 on the mmW frequency layer comprising a plurality of TPs 490 and the logical endpoint 450. The two macro access points 410 and 420 are connected via a macro cell access point/macro cell access point interface 415 (e.g., X2 interface). Each macro cell access point 410 and 420 is associated with some of the plurality of TPs 490 of the mmW layer. The association between the macro cell access points 410, 420 and the TPs 490 may be based on coverage areas. For example, each of the associated TPs 490 may have its coverage area contained within the coverage area of the macro cell access points 410, 420. Some of the TPs 490 may only be associated with the first macro access point 410 and some other TPs may only be associated with the second macro access point 420.

The TPs 490 (or some of the TPs 490) of the first and second macro access points 410 and 420 may be coordinated to form a stable virtual access point 480 with the logical endpoint 450. The stable virtual access point 480 may be formed by TPs 490 associated with more than two different macro access points 410 and 420. The stable virtual access point 480 may comprise the TPs 490a, b and c that are singly (or only) connected to the first macro access point 410, the TPs 490g, h and i that are singly (or only) connected to the second macro access point 420 and the TPs d, e and f that are connected to the first and second macro access points 410 and 420 together.

The logical endpoint 450 forms a first access point/access point interface 460 (e.g., X2 interface) and a second access point/access point interface 470 (e.g., X2 interface). This embodiment allows a handover within the stable virtual access point (e.g., change of involved TPs in the mmW layer) without involving the macro access points 410, 420, thus decoupling the mmW layer mobility from the macro layer.

Figure 5:
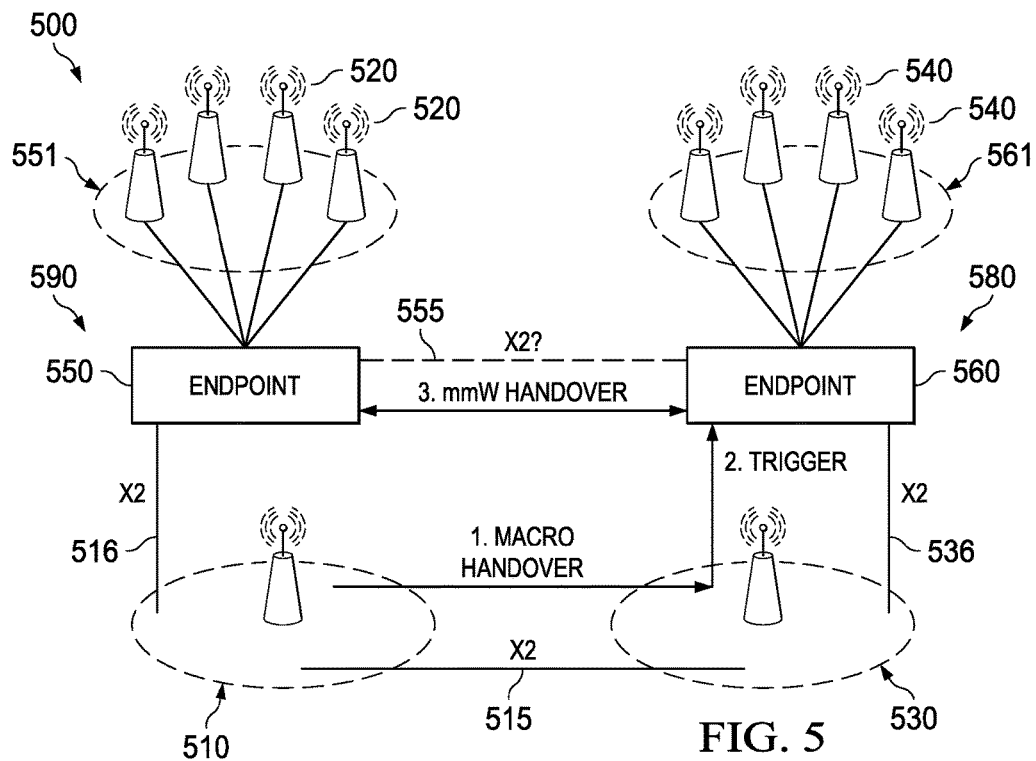
FIG. 5 illustrates a handover procedure between two macro access points and two stable virtual access points according to an embodiment.

FIG. 5 shows a system 500 illustrating an example of a topology with two macro access points and two stable virtual access points 570, 580. The system comprises a first (e.g. source) macro access point 510 (e.g., eNB) with a first plurality of TPs 520 and a second (e.g., target) macro access point 530 (e.g., eNB) with a second plurality of TPs 540. The first plurality of TPs 520 are solely connected to the first macro access point 510 and the second plurality of TPs 540 are solely connected to the second macro access point 530. The first plurality of TPs 520 and the second plurality of TPs 540 are incongruent, different or distinct. The first plurality of TPs 551 form a first stable virtual access point 570 (e.g., stable cloud cell) with a first logical endpoint 550 and the second plurality of TPs 561 form a second stable virtual access point 580 (e.g., stable cloud cell) with a second logical endpoint 560. The first stable virtual access point 570 and the second stable virtual access point 561 are incongruent, different or distinct.

The first macro access point 510 and the second macro access point 530 may form a macro access point/macro access point interface 515 (e.g., X2 interface). The first macro access point 510 and the first logical endpoint 550 may form a first access point/access point interface 516 (e.g., X2 interface) and the second macro access point 530 and the second logical endpoint 560 may form a second access point/access point interface 536 (e.g., X2 interface). The first logical endpoint 550 and the second logical endpoint 560 may form a virtual access point/virtual access point interface 555.

The handover procedure for an UE moving from the first macro access point 510 and a corresponding stable virtual access point 570 (e.g., source access point) to the second macro access point 520 and a corresponding second stable virtual access point 580 (e.g., target access point) is now described. The first macro access point 510 decides to hand the UE over to second macro access point 530 on the macro layer, e.g., the X2 interface. The second macro access point 530 may configure the stable virtual access point 580 with its second logical endpoint 560 and its second plurality of TPs 540 to prepare for the mmW layer handover. The second macro access point 530 may trigger the stable virtual access point 580 (including the second logical endpoint 560) to accept the handover of the UE, and the first stable virtual access point 570 (with its logical endpoint 550) and the second stable virtual access point 580 (with its logical endpoint 560) perform the handover over the first logical endpoint/second logical endpoint interface 555 (e.g., on the mmW layer). The handover may be a proprietary handover procedure, a modified secondary eNB (SeNB) procedure or a new X2 procedure. The actual handover may be invisible to the first and second macro access points 510 and 530. The logical endpoint 560 may notify the target macro access point 530 about the completion of the handover.

According to some embodiments, all that the first and second macro access points 510, 530 may do is to initiate the handover procedure. The actual handover procedure may be performed over the interface 555 by a proprietary protocol or a variation of the X2 protocol (e.g., not a standard X2 protocol). In various other embodiments, the handover may be triggered on the mmW layer and not at the macro level. In these embodiments, the stable virtual access point 560 or the logical endpoint 550 and not the macro access point 510 may initiate the handover procedure. In various embodiments both virtual access points 551, 561 operate on the same frequency or in the same frequency range. In alternative embodiments, the virtual access point 551 and the virtual access point 561 operate on different frequencies or frequency ranges.

Figure 6:
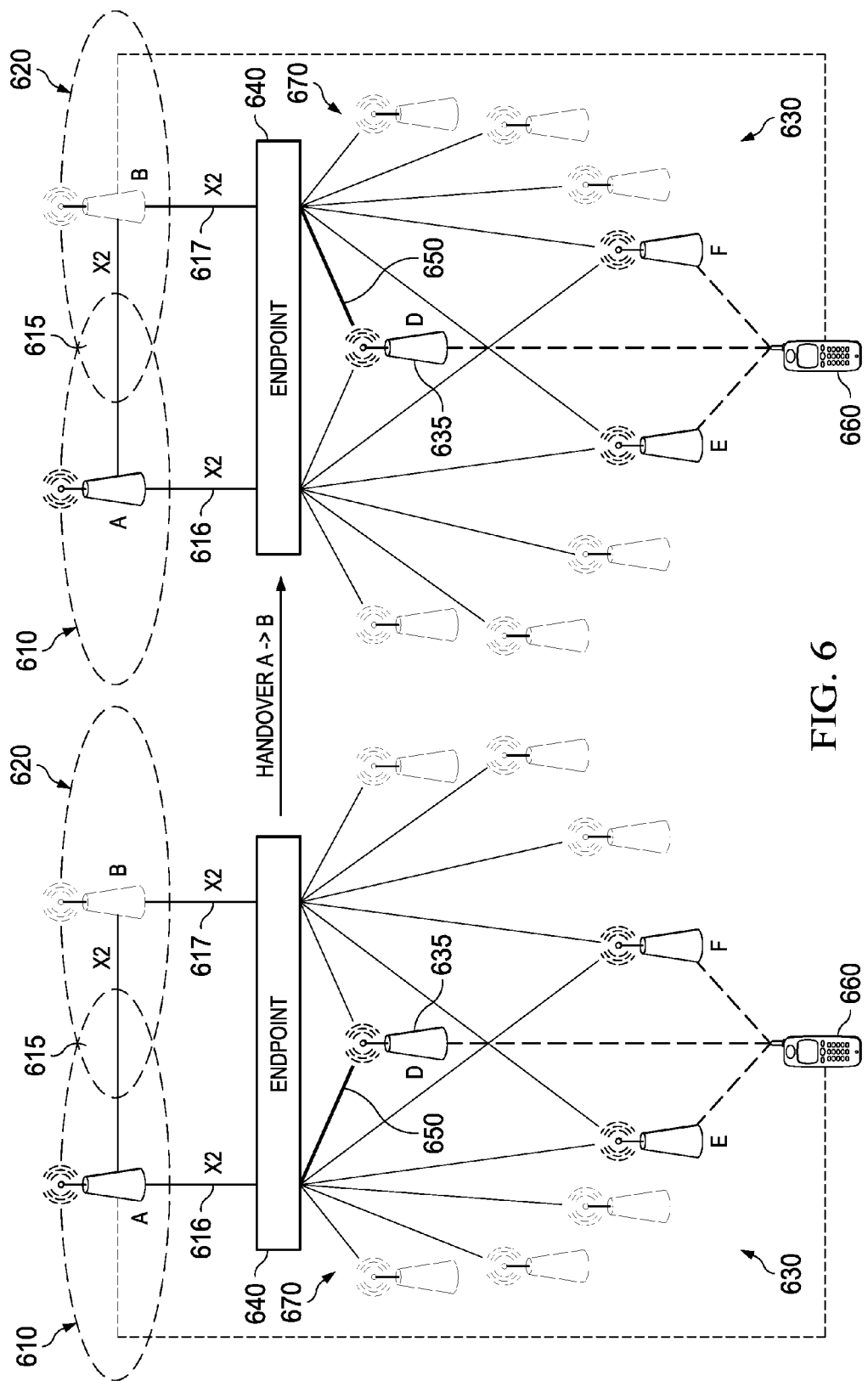
FIG. 6 illustrates a handover procedure between two macro access points and a stable virtual access point according to an embodiment.

FIG. 6 shows a system 600 illustrating an example of two macro access points 610, 620 with a single stable virtual access point 670. The system comprises a first macro access point 610 (e.g., eNB) and a second macro access point 620 (e.g., eNB). The first and second macro access points 610 and 620 are connected to a plurality of TPs 630. The plurality of TPs 630 is connected to both macro access points 610 and 620. The plurality of TPs 630, or a subset thereof, forms a stable virtual access point 670 (e.g., stable cloud cell) with a logical endpoint 640. The logical endpoint 640 is connected to both the first and second macro cells 610 and 620 via interfaces 616 and 617.

The first macro access point 610 and the second macro access point 620 may form a first macro access point/second macro access point interface 615 (e.g., X2 interface). The first macro access point 610 and the logical endpoint 640 may form a first macro access point/virtual access point 616 (e.g., X2 interface) and the second macro access point 620 and the logical endpoint 640 may form a second macro access point/virtual access point 617 (e.g., X2 interface).

The handover procedure for an UE 660 moving from the first macro access point 610 (e.g., source access point or cell) to the second macro access point 620 (e.g., target access point or cell) is now described. The first macro access point 610 decides to hand the UE 660 over to the second macro access point 620 on the macro layer. As described above, at the time of the handover decision all TPs 630 are connected to both macro access points 610 and 620. In contrast to the handover procedure of FIG. 5, the handover may be carried out on the mmW layer by merely repointing the control interface 650 of the MTP 635 from the first macro access point 610 to the second macro access point 620. The repointing of the control interface may comprise changes of interface addresses, routing tables, etc., so that in the handover process, the control interface 650 of the MTP 635 switches from being associated with access point/access point interface 616 to access point/access point interface 617. The changes of the interface addresses, routing tables, etc. may be stored in the logical endpoint 640. In various embodiments this may be seen as a handover procedure on the macro level while preserving the stable virtual access point 670 such as the stable cloud cell (e.g., executing no corresponding handover between TPs) on the secondary level (e.g., mmW layer).

Figure 7:
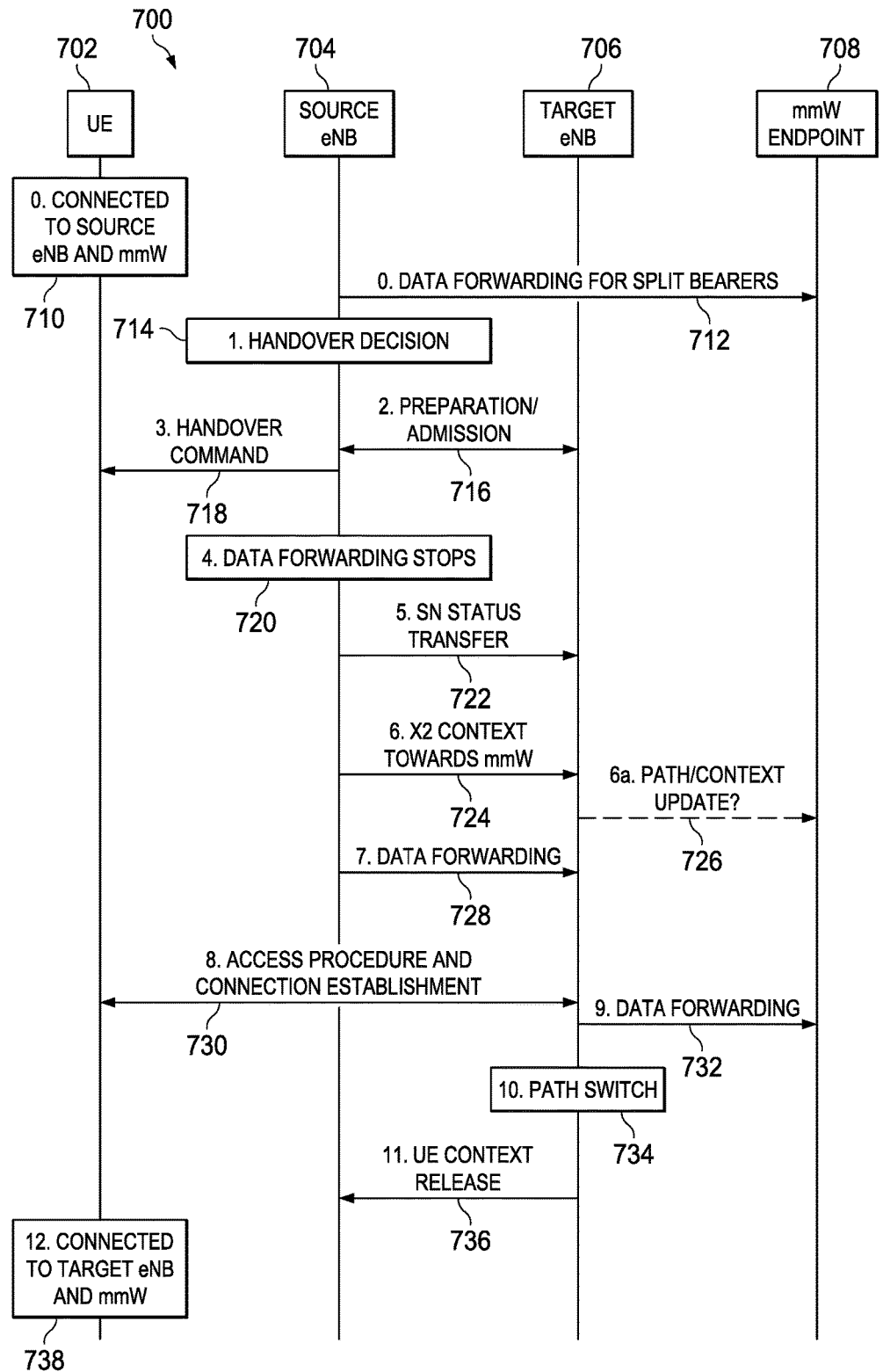
FIG. 7 illustrates a diagram for that hand over procedure.

FIG. 7 shows a diagram 700 illustrating in more detail the behavior of the involved nodes in an example of handover procedure between macro access points 704, 706 when all TPs are connected to both macro access points 704, 706 (similar to scenario of FIG. 6). At steps 710 and 712, the UE 702 is connected to the source macro access point 704 (e.g., source eNB) and the stable virtual access point (including the mmW logical endpoint 708). The source macro access point 704 forwards data for any split user-plane bearers to the logical endpoint 708. In the next step, step 714, the source macro access point 704 decides to handover the UE 702 to the target macro access point 706. The source and target macro access points 704 and 706 exchange preparation and admission information at step 716 and the source macro access point 704 sends a command for handover to the UE 702 at step 718. The source macro access point 704 stops forwarding data to the UE 702 at step 720. In steps 722, 724 and 728, the source macro access point 704 transfers SN status, forwards source macro access point/target macro access point interface (e.g., X2) context information towards the logical endpoint 708 and forwards data to the target macro access point 706. Then the target macro access point 706 may perform an access procedure and connection establishment with the UE in step 730.

After establishing connection to the target macro access point 706, the access point may forward data to the stable virtual access point via logical endpoint 708 at step 732. At step 734 the path is switched and the target macro access point 706 sends a UE context release message to the source macro access point 736. In the last step 738, the UE 702 is connected to the target macro access point 706 and the stable virtual access point (e.g., the logical endpoint 708).

In various embodiments the message flow for the handover from the source to the target macro access point 704, 706 is not so much different from the conventional LTE handover procedures between a source eNB and a target eNB. However, the delivery of downlink data from the core network (e.g., user or UE serving gateway) to the source macro access point 704 is not stopped at step 720. As a result, such downlink data may be buffered in the source macro access point 704, until step 728 when the source macro access point 704 forwards any buffered data to the target macro access point 706. Further downlink data arriving after step 728 at the source access point may be lost. Accordingly, it is preferable if the optional step 726 is performed, allowing an update of the network path for downlink data on split bearers, even before the general "path switch" procedure at step 734 updates the network path for downlink data generally. In some embodiments in split bearer situations, the target macro access point 706 may be buffering uplink data for split bearers from steps 726 to 732, until the path switch procedure at step 734 provides an active data path from the target macro access point 706 to the core network.

Figure 8:
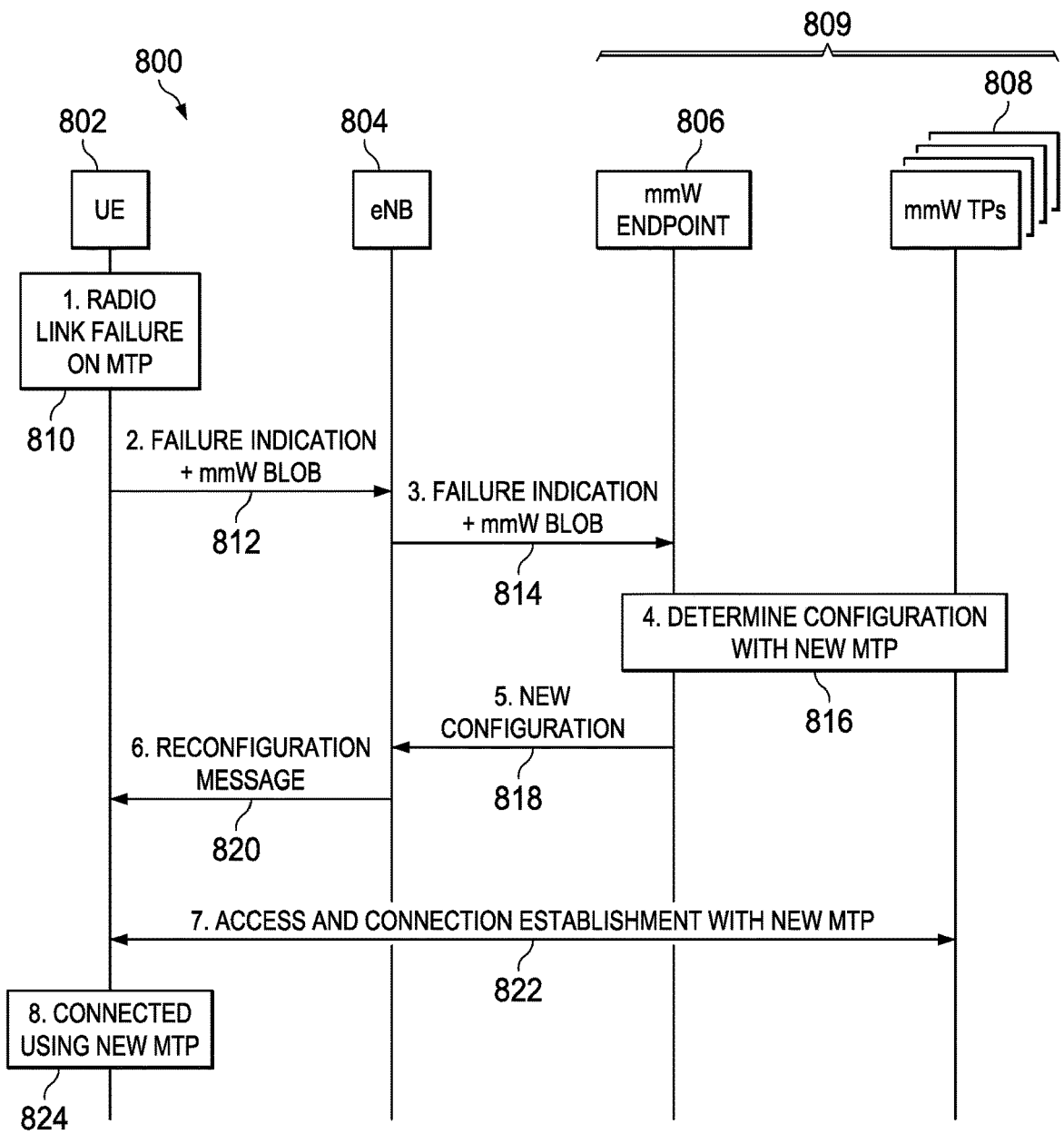
FIG. 8 illustrates a diagram of a connection recovery procedure in a stable virtual access point according to an embodiment.

FIG. 8 shows a diagram 800 illustrating an example of a connection recovery procedure in the stable virtual access point 809 (e.g., the mmW layer). The UE may lose connection to the virtual access point 808 (e.g., cloud cell), or in other words, to the MTP. (Loss of a connection with a (regular) TP in the virtual access point may be handled by the MTP without requiring a connection recovery procedure, and this case is not discussed here. The method 800 may provide a transparent tunneling of mmW measurement data through the macro access point 804 to the stable virtual access point 809 (comprising logical endpoint 806 and TPs 808). At step 810 a radio link failure between the MTP and the UE 802 occurs. In the next steps, at 812 and 814, the UE 802 may send a message to the first macro access point 804 with a failure report or failure indication and the first macro access point 804 may forward this message to the logical endpoint 806. The failure report may be encapsulated in a "blob" structure whose contents may not be interpretable by the macro access point 804. The macro access point 804 may pass the blob to the logical endpoint 806 for handling. The blob may insulate the macro access point 804 from the details of the procedure. The macro access point 804 may just receive a confirmation of reception and a configuration update. Downlink transmissions to the UE may be halted on the mmW layer in the meantime, with downlink data that would otherwise be transmitted by mmW TPs 808 being buffered until it can be transmitted under the control of the newly selected MTP after step 822. The data could be buffered in the logical endpoint 806 (or in whatever physical network node hosts it), in the old MTP, or in user plane node in the core network (e.g., user gateway or serving gateway).

At step 816, the stable virtual access point 809 (logical endpoint 806 and the mmW TPs 808) determines a configuration of the virtual access point with a new MTP. For example, the failure message may be forwarded to the old MTP which can select a new MTP based on the measurements. The virtual access point (e.g., mmW layer) is reconfigured with the new MTP. Then the logical endpoint 806 sends a message with the new configuration 818 to the macro access point 804 and the macro access point 804 forwards this message with the new configuration to the UE 802 at step 820. The UE 802 and the virtual access point (e.g., mmW TPs) 808 perform access and connection establishment with the new MTP at step 822. The UE 802 eventually connects to the new MTP and uses mmW TPs 808 under the control of this new MTP.

Figure 9A:
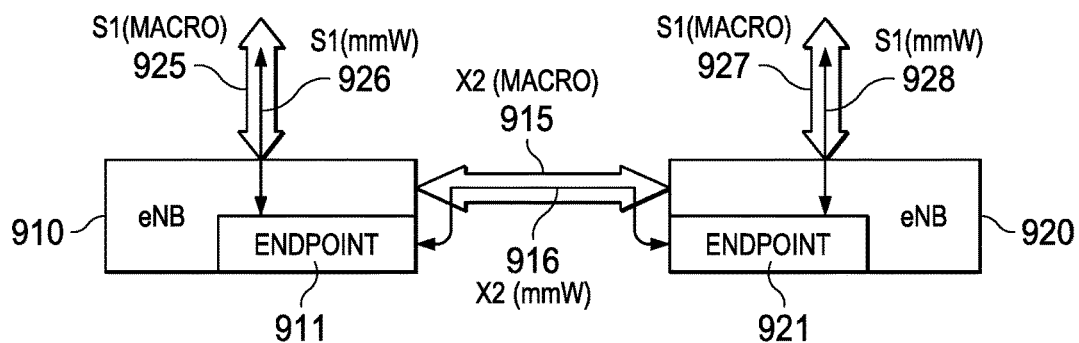
FIGS. 9A-9C illustrate embodiments of deployment of logical endpoint function in network elements or network nodes.
Figure 9B:
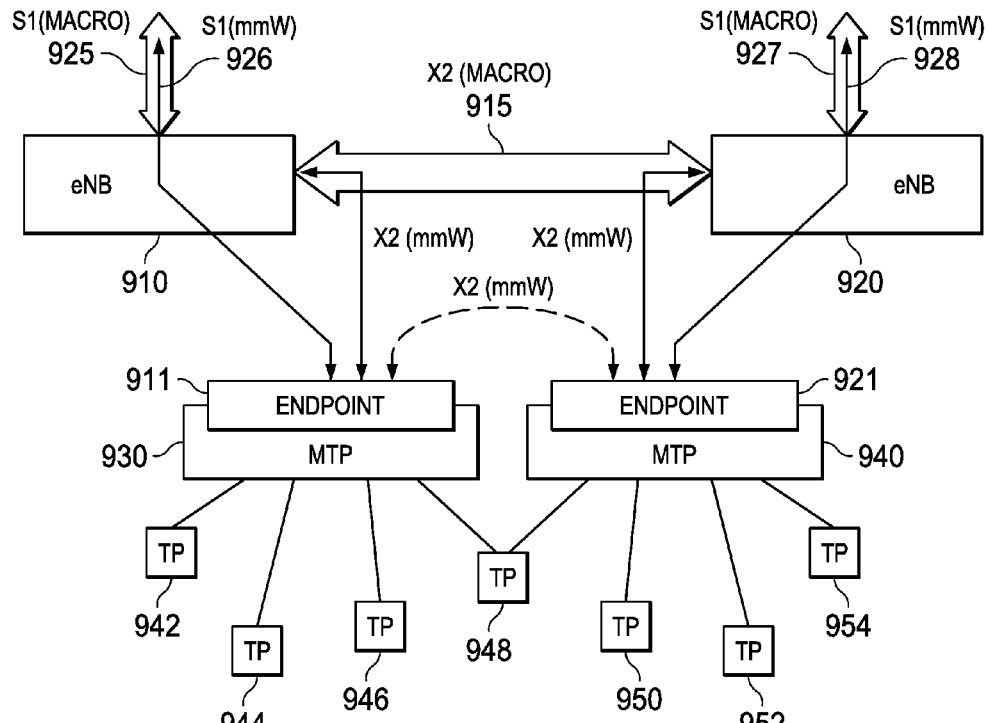
Figure 9C:
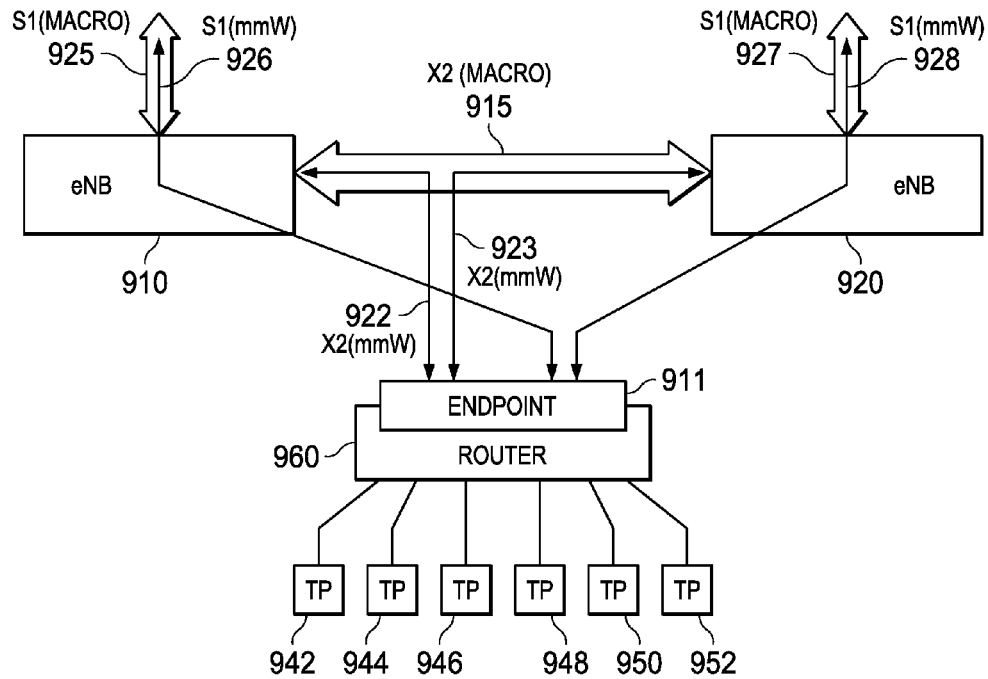

FIGS. 9A-9C show embodiments of hardware or software implementation of the logical endpoint (or the logical endpoint function). FIG. 9A shows an embodiment of a logical endpoint implementation in a macro access point (e.g., eNB). The logical endpoint 911, 921 may be hosted in a macro access point. The logical endpoint 911, 921 may communicate to the TPs via a radio link, a wired communication link such as Ethernet, a microwave link, or an optical fiber connection, etc. The communication between the logical endpoint 911, 921 and the TPs may take place using a fronthaul interface transport.

A first logical endpoint 911 may be implemented in and have an interface to a first macro access point 910 (e.g., eNB) and a second logical endpoint 921 may be implemented in and have an interface to a second macro access point 920 (e.g., eNB). The two endpoints 911 and 921 may communicate with each other over the first macro access point/second macro access point interface 915 (e.g., X2 (macro) interface). The interface 916 between the first logical endpoint/second logical endpoint may be an mmW interface (e.g., X2 (mmW) interface). FIG. 9A further shows a first macro access point/core interface (e.g., S1 (macro) interface) 925 and a second macro access point/core interface (e.g., S1 (macro) interface) 927. The first logical endpoint/core interface (e.g., S1 (mmW)) 926 and the second logical endpoint/core interface (e.g., S1 (mmW)) 928 may use or communicate through the same transport as the interfaces 925 and 927.

This configuration may be applied if each macro access point is associated with distinct pools of TPs (singly connected) and manages these TPs through the respective logical endpoints in some embodiments. However, in other embodiments, this configuration may be applied to situations where TPs are multi-connected TPs where the TPs are part of the virtual access points related to the first and the second logical endpoint 911 and 921.

FIG. 9B shows another embodiment of a logical endpoint implementation. For example, the logical endpoints may be hosted in MTPs. For example, a first logical endpoint 911 may be implemented in a first MTP 930 and a second logical endpoint 921 may be implemented in a second MTP 940. The logical endpoint function may comprise an interface to the MTP functions of the transmission points. For example, these may be two processors connected via a bus or a single processor comprising these two functions and the functions communicate with each other according to an interface (adaption layer) protocol.

The TPs 940-954 are connected or in communication with the MTP logical endpoints 911 and 921 (e.g., radio link). In this example, TP 948 is a dual connected TP while all other TPs are singly connected either to the first logical endpoint 911 or the second logical endpoint 921. The two endpoints 911 and 921 may communicate indirectly with each other over the first macro access point/second macro access point interface 915 (e.g., macro X2 interface) or over a direct interface 917 (e.g., mmW interface (e.g., mmW X2 interface)). FIG. 9B further shows first macro access point/core interface (e.g., S1 (macro) interface) 925 and a second macro access point/core interface (e.g., S1 (macro) interface) 927. The first logical endpoint/core interface (e.g., S1 (mmW)) 926 and the second logical endpoint/core interface (e.g., S1 (mmW)) 928 may use or communicate through the same transport as the interfaces 925 and 927. Interfaces between the MTPs 930, 940 and macro access points 910 and 920 may be structured as a "flex interface" providing connectivity between any one of the MTPs 930, 940 and any one of the macro access points 910, 920.

FIG. 9C shows yet another embodiment of a logical endpoint implementation. For example, the logical endpoint may be hosted in a router of the underlying transport used within between nodes of the network, e.g., an IP router. FIG. 9C shows a first macro access point 910 (e.g., eNB) and a second macro access point 920 (e.g., eNB). The first macro access 910 has a first macro access point/core interface (e.g., S1 (macro) interface) 925, the second macro access point has a macro access point/core interface (e.g., S1 (macro) interface) 927 with the core and a first macro access point/second macro access point interface with each other (e.g., X2 (macro)) 915.

The logical endpoint 910 is connected to a plurality of TPs 942-952. The logical endpoint 911 may be implemented on a router 960. The logical endpoint 911 hosted by the router 960 may comprise a first interface 922 (e.g., X2 (mmW)) with the first macro access point 910 and a second interface 923 (e.g., X2 (mmW)) with the second macro access point 920. The logical endpoint 911 may comprise a first logical endpoint/core interface (e.g., S1 (mmW)) 926 and the second logical endpoint/core interface (e.g., S1 (mmW)) 928. The logical endpoint 910 may communicate through the interfaces 926 and 928 with the core.

Figure 10:
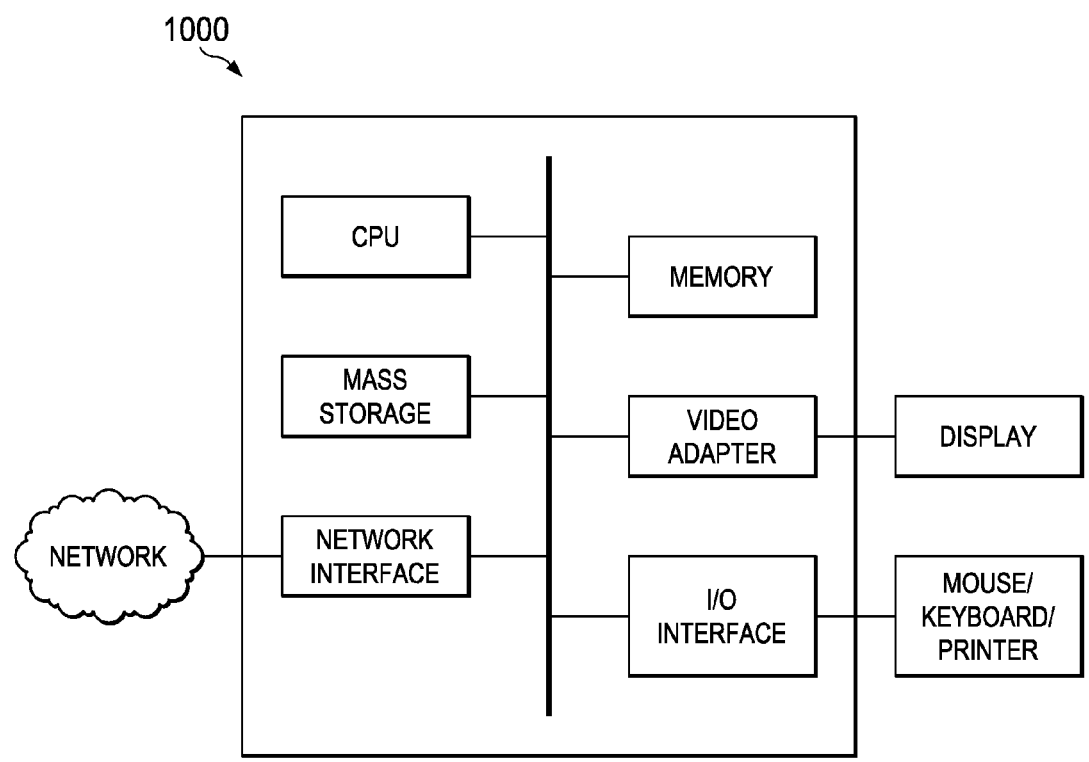
FIG. 10 is a block diagram of a processing device.

FIG. 10 is a block diagram of a processing device 1000 that may be used for implementing the apparatuses and methods disclosed herein. The specific device 1000 may utilize all of the components shown, or only a subset of the components, and levels of integration may vary from device to device. Furthermore, the device 1000 may contain multiple instances of a component, such as multiple processing units, processors, memories, transmitters, receivers, etc. The processing device 1000 may comprise a processing unit equipped with one or more input/output devices, such as a speaker, microphone, mouse, touchscreen, keypad, keyboard, printer, display, and the like. The processing device 1000 may include a central processing unit (CPU), memory, a mass storage device, a video adapter, and an I/O interface connected to a bus. The processing device 1000 may be a macro access point (e.g., eNB), a transmission point or a router.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

In various embodiments each radio node 1000 has several buffers allocated in the memory, for example. Each buffer is linked to a specific mobile communication service or different types of traffic sources.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for a link recovery performed by a virtual access point, the method comprising:

storing, by a logical endpoint of the virtual access point, a connection status of a user equipment (UE), wherein the virtual access point comprises the logical endpoint and a plurality of transmission points (TPs) including a first master transmission point (MTP), the logical endpoint comprises an interface with a macro access point and a routing address, with the plurality of TPs being coupled to the macro access point via the interface and the routing address of the logical endpoint;

communicating, by the logical endpoint, with the UE through the macro access point regarding the connection status of the UE;

receiving, by the logical endpoint, a failure indication message and a measurement report from the macro access point, wherein the failure indication message indicates that a radio link failure between the first MTP and the UE, wherein the measurement report comprises information of a second plurality of TPs connecting to the UE, and wherein the measurement report is in a Binary Large Object (blob);

buffering, by the logical endpoint, downlink data to be transmitted to the UE;

determining, by the logical endpoint, a configuration of the virtual access point with a second MTP; and sending, by the logical endpoint, a message with the configuration to the macro access point.

2. The method according to claim 1, further comprising operating in a dual connectivity configuration with regard to the macro access point and the stable virtual access point.

3. The method according to claim 1, wherein the routing address of the logical endpoint is different from routing address of the TPs.

4. The method according to claim 1, further comprising:
connecting, by the second MTP, with the UE; and
controlling, by the second MTP, the TPs to communicate with the UE.

5. A stable virtual access point comprising:

a logical endpoint comprising an interface with a macro access point and a routing address; and a plurality of transmission points (TPs) including a first master transmission point (MTP), wherein the plurality of TPs provide a coordinated data transmission to an user equipment (UE), wherein the plurality of TPs being coupled to the macro access point via the interface and the routing address of the logical endpoint, and wherein the logical endpoint is configured to:

store a connection status of the UE;

communicate with the UE via the macro access point regarding the connection status of the UE;

receive a failure indication message and a measurement report from the macro access point, wherein the failure indication message indicates that a radio link failure between the first MTP and the UE, wherein the measurement report comprises information of the second plurality of TPs connecting to the UE, and wherein the measurement report is in a Binary Large Object (blob);

buffer downlink data to be transmitted to the UE;

determine a configuration of the stable virtual access point with a second MTP; and send a message with the configuration to the macro access point.

6. The stable virtual access point according to claim 5, wherein the UE is configured to operate in a dual connectivity configuration with regard to the macro access point and the stable virtual access point.

7. The stable virtual access point according to claim 5, wherein the routing address of the logical endpoint is different from routing address of the TPs.

8. The stable virtual access point according to claim 5, wherein the logical endpoint is configured to receive a measurement report from the UE, with the measurement report comprising information of a second plurality of TPs connecting to the UE.

9. The stable virtual access point according to claim 8, wherein the measurement report is in a binary large object (blob).

10. The stable virtual access point according to claim 5, wherein the second MTP is configured to connect with the UE, and control the TPs to communicate with the UE.

\* \* \* \* \*